United States Patent [19]   [11] Patent Number: 4,952,018
Young et al.                    [45] Date of Patent: Aug. 28, 1990

[54] OPTICAL IN LINE FILTERS

[75] Inventors: Terence P. Young; Ian R. Croston, both of Essex, United Kingdom

[73] Assignee: GEC-Marconi Limited, Stanmore, United Kingdom

[21] Appl. No.: 313,787

[22] Filed: Feb. 23, 1989

[30] Foreign Application Priority Data

Feb. 26, 1988 [GB] United Kingdom ............... 8804569
Sep. 30, 1988 [GB] United Kingdom ............... 8823005

[51] Int. Cl.$^5$ .............................................. G02B 6/26
[52] U.S. Cl. .................................. 350/96.15; 350/96.12
[58] Field of Search ................ 350/96.15, 96.14, 96.12

[56] References Cited
U.S. PATENT DOCUMENTS

| 3,920,314 | 11/1975 | Yajima | 350/96.12 |
| 4,201,447 | 5/1980 | Thompson et al. | 350/96.15 X |
| 4,674,827 | 6/1987 | Izutsu et al. | 350/96.12 |
| 4,701,009 | 10/1987 | Tangonan et al. | 350/96.12 |
| 4,820,009 | 4/1989 | Thaniyavarn | 350/96.15 X |
| 4,842,367 | 6/1989 | Djupsjöbacka | 350/96.15 X |

Primary Examiner—John D. Lee
Assistant Examiner—Phan T. Heartney
Attorney, Agent, or Firm—Spencer & Frank

[57] ABSTRACT

An optical in-line filter comprises a first waveguide whose output end is coupled to a second, narrower waveguide such that light from the first waveguide of a predetermined waveband or wavebands only is passed to the second waveguide light of other wavebands emerging elsewhere from the open end of the first waveguide.

14 Claims, 4 Drawing Sheets

OPTICAL IN LINE FILTERS

FIELD OF THE INVENTION

This invention relates to an optical in-line filter, that is to a filter for passing only a desired wavelength component of an input optical signal, and is particularly useful in an integrated optical device.

BACKGROUND OF THE INVENTION

There is a demand for an integrated optical filter capable of selecting one or more optical wavebands from an input signal, in a way which ensures low power loss.

SUMMARY OF THE INVENTION

The invention provides an optical in-line filter comprising a first, multi-mode waveguide whose output end is coupled to an open end of a second, narrower waveguide the said coupling and the length of the first waveguide being such that light entering the first waveguide undergoes interference between at leasat two of its modes causing light from the first waveguide of substantially a predetermined wavelength or wavelengths only to be passed to the second waveguide, light of other wavelengths emerging elsewhere from the output end of the first waveguide. The first waveguide supports at least three different transverse modes, so that the transverse power distribution oscillates as a function of the length along the waveguide. The length of the waveguide may therefore be selected precisely such that, for the optical waveband which is required to be selected by the second waveguide, the optical power is at a maximum at the interface between the first and second waveguides.

In one example, this interface is at a central region of the first waveguide. Thus, in this example, the second waveguide is coupled so as to collect light from a central region of the open end of the first waveguide.

It is prefered that light entering the first waveguide undergoes interference between its first (fundamental) and third order modes, although other modes may be chosen by suitably configuring the filter. For example, interference may be arranged to occur between both symmetric and asymmetric modes.

A waveguide, section of greater width than the first waveguide may be arranged at its input end, and may have smoothly shaped edges, giving it a "bulbous configuration".

By employing a bulbous waveguide section before the first waveguide, it is possible to ensure that the power in the modes between which interference occurs is substantially equal, thus optimising the performance of the filter.

BRIEF DESCRIPTION OF THE DRAWINGS

Some ways in which the invention may be performed are now described by way of example with reference to the accompanying schematic drawings, in which.

DESCRIPTION OF THE PREFERRED EMBODIMENTS

Figure 1:
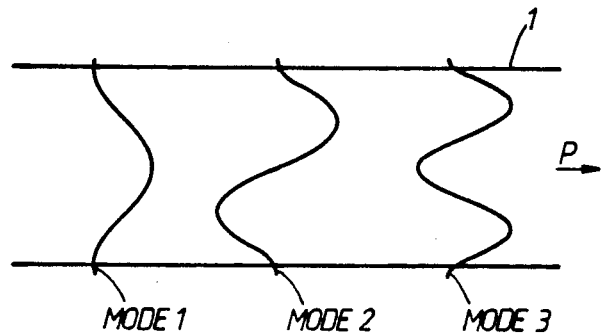
FIG. 1 is a diagram showing the first three modes of propagation of an optical wave along a waveguide.
Figure 2:
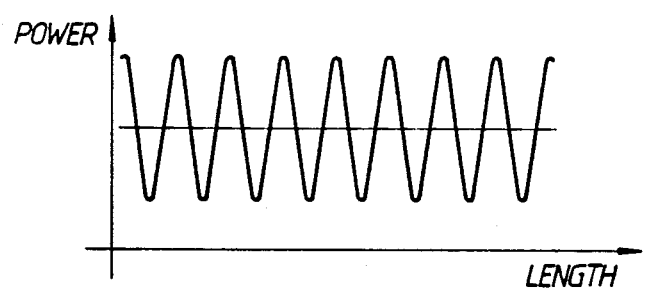
FIG. 2 is a graph illustrating the variation of optical power with distance lengthwise along the centre of the waveguide, for light of a particular wavelength.

With reference to FIG. 1, an optical wave propagating along a waveguide 10 in a direction P may be supported in one or more modes: mode 1 (symmetric), mode 2 (asymmetric) and mode 3 (symmetric) being the first three of the series. The overall optical power at the particular wavelength concerned is the assumption of the amplitudes of all these modes, and the power at any given transverse position oscillates as a function of the distance along the length of the waveguide 1. The variation in the power with distance along the centre-line of the waveguide 1 is illustrated in FIG. 2.

Figure 3A:
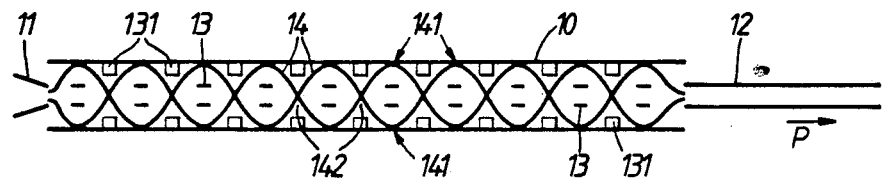
FIGS. 3a and 3b are diagrams, not drawn to scale, of an integrated optical device embodying the invention, showing in FIG. 3a a waveform of a wavelength which is passed from the first to the second waveguide, and in FIG. 3b one of a wavelength which is not passed to the second waveguide.
Figure 3B:
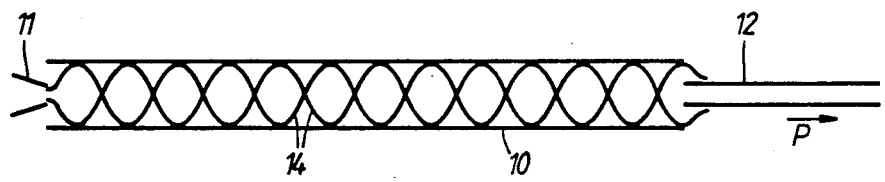

The positions of minima and maxima along the waveguide 1 depend (among other things) on the wavelength of the light, and the invention exploits this phenomenon by collecting from the output end of the waveguide only those wavelengths for which the maximum power lies at a predetermined transverse region of the waveguide end. The resulting optical filter is an in-line filter, and one example is shown in FIGS. 3a and 3b.

A three-mode waveguide 10 receives light at a central transverse region of one end, from a waveguide 11. This excites almost exclusively mode 1 and mode 3 vibrations, since this combination of modes has a wave function, as shown in FIG. 1, with an amplitude peak at the central region. Thus the fundamental mode (mode 1) of the input waveguide 11 excites the first and third order modes of waveguide 10.

Since these modes 1 and 3 propagate at different velocities, the interference between them causes the light to oscillate into the centre and out to the sides, producing the power variation described above with reference to FIG. 2. This power distribution is represented in FIGS. 3a and 3b by the curves 14, whose peaks and troughs, such as 141, are located at regions of maximum power at the sides of the waveguide, and whose cross-over regions, such as 142, represent regions of maximum power at the centre of the waveguide. The power of course varies gradually between these extremes.

An output waveguide 12, which is narrower than the width of the main waveguide 10, being typically 30% to 50% of its width, is placed in line with the main waveguide 10 with its open end coupled to a central region of the open end of the main waveguide 10 remote from the input waveguide 11. Light of a waveband, as shown in FIG. 3a, which has a power maximum at the central end region of the waveguide 10 is passed into the output waveguide 12, with very little power loss externally of the output waveguide. This condition is satisfied by a series of wavebands. Light which does not satisfy this condition, as shown in FIG. 3b, emerges elsewhere from the open end of the main waveguide 10.

The discrimination of the resulting optical filter may be enhanced by the provision of a regular array 13 of baffles or stops as shown in FIG. 3a. Alternative, or additional, baffle points 131 are also shown in FIG. 3a. These may be formed as scattering points or absorption points.

In this example, the waveguides are formed as an integrated optical structure in a lithium niobate substrate, using conventional materials, and manufactured conventionally, for example by proton exchange and titanium diffusion. The scattering points or absorption points 13 may be formed for example by carrier diffusion, from gas or solid states, or by ion implantation.

The width of the output waveguide 12 may be made sufficiently small to discriminate between wavelengths to the degree required over a given propagation length, yet sufficiently great to avoid excessive power loss. Further, in this embodiment of the invention, the width must support at least three modes but exclude the fifth mode.

Figure 4:
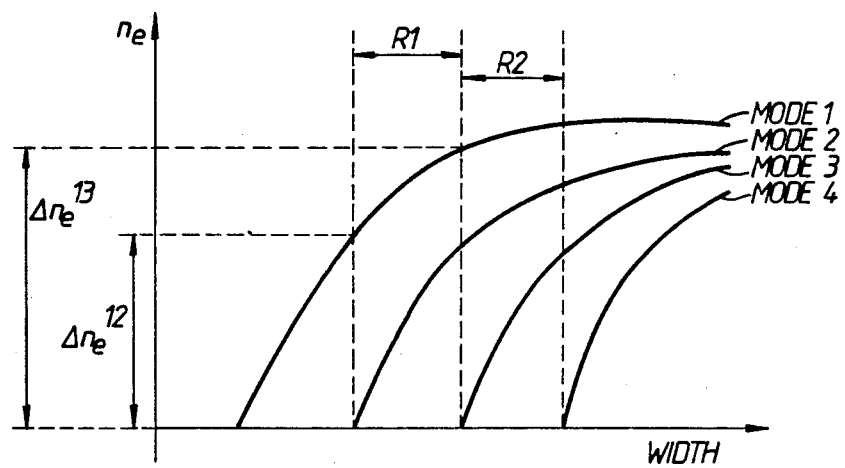
FIG. 4 is a graph illustrating, for each of the first four modes of propagation, the variation of effective refractive index $n_e$ with the width of the first waveguide of the device of FIG. 3.

With reference now to FIG. 4, the width of the main waveguide 10 is selected within the range R2 in which modes 1, 2 and 3 are all supported and in which the difference $\Delta n_e^{13}$ between the effective refractive indices of the waveguide for modes 1 and 3 is substantial so as to provide a good coupling strength between the modes, which in turn reduces the length of waveguide required. Clearly, the narrower widths in range R2 give the best coupling strength and are preferred. The width could be greater than range R2, so as to support mode 4, provided that the next symmetric mode, mode 5, is not also supported. By way of comparison, the range R1 of widths of a two mode interferometer device is also shown in FIG. 4: the difference $\Delta n_e^{12}$ between the refractive indices for the two modes is substantially lower.

A coupling length for the structure may be defined as:

$$Lc = \frac{\pi}{2K}$$

where $K_{ij}$ is the coupling strength between modes i and j:

$$K_{ij} = \frac{k(n_e^i - n_e^j)}{2}$$

and k is the wave vector. The effective refractive index $n_e$ is equal to the propagation constant divided by the wave vector k, and is the effective index of a three-dimensional device, which may have multiple layers, when viewed as a two-dimensional device, as is the case in FIGS. 1 and 3. In this example, the device consists of a thin, strip-like channel on the surface of a substrate, so that the channel acts in effect as a two-dimensional waveguide. $n_e^i$ is the effective refractive index for mode i: the coupling strength k relates to modes i and j.

Figure 5:
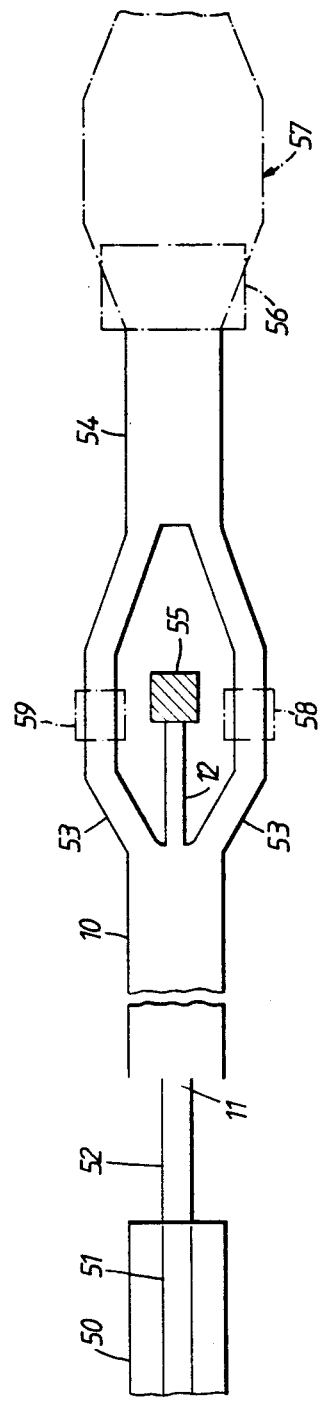
FIG. 5 is a diagram, not drawn to scale, of an optical in-line filter including at least one integrated filter of the type shown in FIG. 3.

With reference now to FIG. 5, the optical in-line filter of FIG. 3a is incorporated into a more complex filter. Light from an optical fibre 50 with a core 51 is collected by a single mode waveguide 52 with an output end 11 coupled to the waveguide 10. The output waveguide 12, coupled to the central region of the main waveguide 10, provides light at one filtered waveband to a detector 55. Most of the remaining output light is collected by a further pair of symmetrically-disposed output waveguides 53 whose outputs are either detected by one or both of two further detectors 58, 59 or else are recombined in a multi-mode waveguide 54, in series with a main waveguide 10. Thus the light in waveguides 53 and 54 contains those frequencies which have not been filtered out by the first filter 10, 12, 53. This light may simply be detected in a further detector 56 (an alternative to detectors 58, 59), or instead it may be filtered once again at 57 by an optical in-line filter similar to the first one but arranged to filter different wavebands.

In a simple two-wavelength system, the filter can terminate with the adjacent detectors 55, 58 and 59; the outputs of detectors 58 and 59 could be combined.

Although the invention has been illustrated in the form of a triple mode waveguide coupled at its input and output at central transverse regions, alternative configurations are of course possible, depending on the optical performance required and on the materials used.

Figure 6:
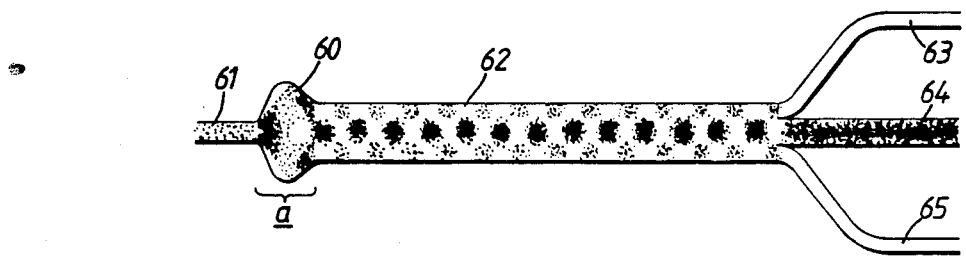
FIG. 6 schematically illustrates another integrated optical device in accordance with the invention.

With reference to FIG. 6, an optical in-line filter comprises a bulbous waveguide section 60 to which light may be applied via waveguide 61, a multi-mode waveguide section 62 which is arranged to receive light from the bulbous section 60 and which is capable of supporting three modes, and three output waveguides 63, 64 and 65. The central output waveguide 64 is arranged along the longitudinal axis of section 62 and the other two output waveguides 63 and 65 are arranged at the edges of section 62 at its output.

The greatest width of the bulbous section 60 supports six modes and enables good mixing to be achieved between the first and third order modes.

Figure 7:
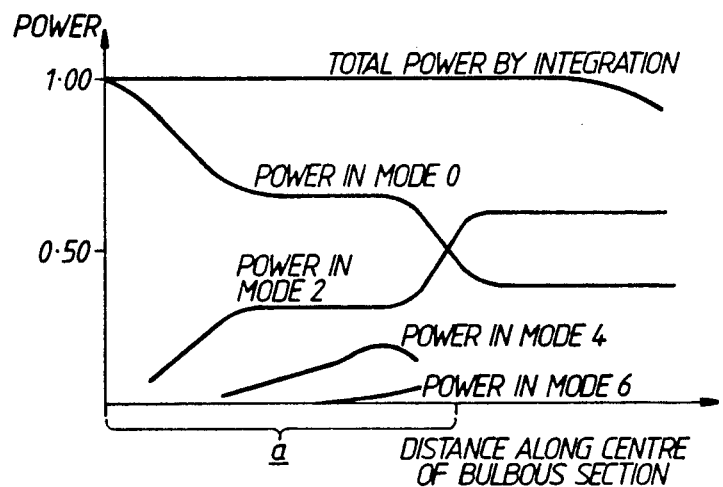
FIG. 7 is an explanatory diagram relating to the operation of the device shown in FIG. 6.

FIG. 7 schematically illustrates the modal power distribution along the centre line of the bulbous section 60. It can be seen that, at the output of the bulbous section 60, there is an equal distribution of power between the first and third order modes. Interference between the first and third order modes produces the power distribution along the section 62 as shown in FIG. 6, where the amount of shading indicates the optical power at a given location. For the wavelength illustrated, it can be seen that the power is coupled out of section 62 along the central output waveguide 64. At another wavelength, the greatest energy intensity is towards the edges of section 62 at its output and therefore optical power is coupled into the other two waveguides 63 and 65, these two guides together forming a single output port. The central guide 64 forms another port.

The use of the bulbous section 60 thus enables equal powers to be obtained in the first and third order modes, thus optimising the launch conditions into the multi-mode section 62.

We claim:

1. An optical in-line filter comprising: a first, multi-mode waveguide; and a second waveguide narrower than said first waveguide, the output end of said first waveguide being coupled to an open-end of said second waveguide, the said coupling and the length of said first waveguide being such that light entering said first waveguide undergoes inteference between at least two of its modes causing light of substantially a predetermined wavelength or wavelengths only to be passed to said second waveguide from said first waveguide, light of other wavelengths emerging elsewhere from the output end of said first waveguide.

2. A filter according to claim 1, wherein light entering said first waveguide undergoes interference between its first (fundamental) and third order modes.

3. A filter according to claim 1 wherein said second waveguide is coupled so as to collect light from a central region of the output end of said first waveguide.

4. A filter according to claim 1, in which said second waveguide is coupled to a detector.

5. A filter according to claim 1, comprising a third waveguide, separate from said second waveguide coupled at one end to a different region of the output end of said first waveguide to collect at least some of the light of other wavelengths.

6. A filter according to claim 5, in which said second waveguide is coupled to a detector and in which said third waveguide is coupled to the input of a further optical in-line filter in accordance with claim 1 arranged to filter a different waveband or different wavebands.

7. A filter according to claim 1, in which said first and second waveguides are channels of an integrated optical device.

8. A filter according to claim 7, in which the width of said first waveguide channel is in the range such that said first waveguide supports a symmetric, third mode waveform which is coupled strongly to a corresponding symnmetric, first mode waveform.

9. A filter according to claim 1, comprising means for directing an input optical wave into a central region of an input end of said first waveguide.

10. A filter according to claim 1 and including a waveguide section arranged at the input end of said first waveguide such that light from said waveguide section is coupled into said first waveguide and wherein said waveguide section is wider over at least some of its length than said first waveguide.

11. A filter according to claim 10 wherein said waveguide section has smoothly curving bounds.

12. A filter according to claim 10 wherein said waveguide section is capable of supporting at least the sixth order mode at its widest part.

13. A filter according to claim 1 and including three relatively narrow waveguides coupled to the output end of said first waveguide and arranged such that light of substantially one predetermined wavelength or wavelengths is coupled into one narrow waveguide and light of other wavelengths is coupled into both of the other narrow waveguides.

14. An optical in-line filter, comprising:
a first multi-mode waveguide having an input end for receiving light and an output end, said first waveguide supporting at least three transverse modes; and
a second waveguide having an open input end and being narrower than said first waveguide, said second waveguide being arranged in-line with said first waveguide with said open input end being coupled to the output end of said first waveguide at a predetermined transverse position of said first waveguide so that light entering said first waveguide undergoes interference between at least two of its modes and only light of a predetermined wavelength or wavelengths is passed to said second waveguide from said first waveguide and light of other wavelengths emerges elsewhere from the output end of said first waveguide.

* * * * *